US012234666B2

(12) United States Patent
Lin et al.

(10) Patent No.: US 12,234,666 B2
(45) Date of Patent: Feb. 25, 2025

(54) DOOR HANDLE ADAPTER FOR SPRUNG HUB

(71) Applicant: ASSA ABLOY AMERICAS RESIDENTIAL INC., New Haven, CT (US)

(72) Inventors: James Lin, Laguna Niguel, CA (US); Eric Xin, Xaimen (CN); Doo Fai Yip, Rowland Heights, CA (US)

(73) Assignee: ASSA ABLOY AMERICAS RESIDENTIAL INC., New Haven, CT (US)

( * ) Notice: Subject to any disclaimer, the term of this patent is extended or adjusted under 35 U.S.C. 154(b) by 0 days.

(21) Appl. No.: 18/344,217

(22) Filed: Jun. 29, 2023

(65) Prior Publication Data

US 2024/0003162 A1 Jan. 4, 2024

Related U.S. Application Data

(63) Continuation of application No. 15/856,694, filed on Dec. 28, 2017, now Pat. No. 11,725,416.

(Continued)

(51) Int. Cl.
*E05B 1/00* (2006.01)
*E05B 3/04* (2006.01)

(Continued)

(52) U.S. Cl.
CPC .............. *E05B 1/0053* (2013.01); *E05B 3/04* (2013.01); *E05B 3/065* (2013.01); *E05B 15/0013* (2013.01)

(58) Field of Classification Search
CPC ...... E05B 2001/0076; E05B 3/08; E05B 3/04; E05B 3/065; E05B 15/04; E05B 15/0013;

(Continued)

(56) References Cited

U.S. PATENT DOCUMENTS 5,205,596 A 4/1993 Ralph
5,335,948 A 8/1994 Norton, II et al.

(Continued)

FOREIGN PATENT DOCUMENTS

DE 9016080 2/1991
DE 29517151 12/1995

(Continued)

OTHER PUBLICATIONS

International Search Report and Written Opinion for International Application No. PCT/US2014/068783, mailed May 11, 2018 (19 pgs).

(Continued)

*Primary Examiner* — Christine M Mills
*Assistant Examiner* — Yahya Sidky
(74) *Attorney, Agent, or Firm* — Merchant & Gould P.C.

(57) ABSTRACT

An adapter for either a handle set or a lever set door lever is equipped with a pair of springs to provide a pre-load on the spindle. The pre-load prevents sagging of the lever due to the large mass of the lever. A sleeve in the adapter is formed out of a compressible material that accepts the spindle in a press-fit configuration. This allows for greater manufacturing tolerances while still providing a solid and secure engagement between the spindle and the adapter. As a result, any free play in the lever is eliminated and the lever is maintained in a horizontal, home position when the lever is not in use. Following use through rotation of the lever, the springs promptly return the lever back to the home position while the sleeve prevents any slop or free-play in the lever's motion.

20 Claims, 7 Drawing Sheets

Related U.S. Application Data

(60) Provisional application No. 62/439,974, filed on Dec. 29, 2016.

(51) Int. Cl.
*E05B 3/06* (2006.01)
*E05B 15/00* (2006.01)

(58) Field of Classification Search
CPC ..... E05B 2015/0406; E05B 2015/0448; E05B 2015/0496; E05B 1/0053; E05C 1/085; E05C 1/12; E05C 1/16; E05C 1/163; Y10T 292/0969; Y10T 292/097; Y10T 292/1014; Y10T 292/1016; Y10T 292/59; Y10T 292/93; Y10T 292/96; Y10S 292/52; Y10S 292/61
See application file for complete search history.

(56) References Cited

U.S. PATENT DOCUMENTS

| | | | |
|---|---|---|---|
| 5,658,026 | A | 8/1997 | Nigro, Jr. et al. |
| 6,491,327 | B1 | 12/2002 | Fan |
| 6,921,116 | B2 | 7/2005 | Humes |
| 2006/0043742 | A1 | 3/2006 | Huang et al. |
| 2010/0264672 | A1 | 10/2010 | Ellis |
| 2014/0165669 | A1 | 6/2014 | Tien |
| 2016/0083976 | A1 | 3/2016 | Rickenbaugh et al. |
| 2020/0115937 | A1 | 4/2020 | Xin et al. |

FOREIGN PATENT DOCUMENTS

| | | | | | |
|---|---|---|---|---|---|
| EP | 0761912 | | | 3/1997 | |
| GB | 916185 | | | 1/1963 | |
| GB | 2359849 | | | 9/2001 | |
| GB | 2359849 | A | * | 9/2001 | ......... E05B 15/0053 |
| TW | M367955 | | | 11/2009 | |
| WO | 200134926 | | | 5/2001 | |
| WO | WO-0134926 | A1 | * | 5/2001 | ............... E05B 3/00 |

OTHER PUBLICATIONS

Machine Translation of WO0134926A1, 2020, pp. 1-2 (Year: 2020).

* cited by examiner

DOOR HANDLE ADAPTER FOR SPRUNG HUB

CROSS-REFERENCE TO RELATED APPLICATIONS

This application is a continuation of U.S. patent application Ser. No. 15/856,694, filed Dec. 28, 2017, now U.S. Pat. No. 11,725,416; which claims priority to U.S. Provisional Patent Application No. 62/439,974, filed Dec. 29, 2016, the disclosures of which are hereby incorporated by reference in their entireties.

TECHNICAL FIELD

This invention relates to the field of door locks. More particularly, this invention relates to hub adapters for door handles with removable spindles.

BACKGROUND OF THE INVENTION

Door knobs and levers are known to include springs that return the knob or lever back to a home position. This allows an operator to rotate the knob or lever, retract the latch, and open the door. Releasing the knob or lever allows the spring to use stored energy and return the knob or lever to its original position.

Different springs are also commonly used on door knobs and levers. As a lever extends away from the axis of rotation, a greater amount of resistive force is generated by the mass of the lever. Door knobs have a consistent mass around the entire rotational axis and do not extend as far from the rotational axis. For this reason, lighter springs are typically used on door knobs and heavier springs are used on levers.

One problem associated with sprung levers is that the lever can sag and not rest at a perfectly horizontal position. Efforts to resolve this issue have included simply using a stronger spring, but the increased resistance experienced by the operator is not optimal. Another problem associated with sprung levers is that the connection of the lever to the latch mechanism often includes some play, allowing the operator to loosely jiggle the handle. This issue has been addressed in the past by simply manufacturing pieces with tighter tolerances. Success has been limited as the tighter tolerances cause binding and require perfect alignment of the components, which rarely happens in installations.

What is therefore needed is an improved mechanism that prevents sagging of a lever handle. What is also needed is an improved mechanism that prevents a loose connection of the lever handle thereby minimizing any free-play.

SUMMARY AND OBJECT OF THE INVENTION

A door handle adapter comprising: a spindle configured to engage the door handle and transfer an input rotational force from the door handle; a hub with a central aperture configured to receive the spindle and further transfer the rotational force from the spindle; a first engager extending from an outer circumference of the hub; a second engager opposite the first engager extending from the outer circumference of the hub; a slider with a first receiver configured to engage the first engager and a second receiver configured to engage the second engager such that as the rotational force is transmitted to the hub, thereby axially rotating the hub, at least one of the first and second engager linearly displace the slider; a first spring configured to engage the first receiver when the rotational force is in a first direction and also when the rotational force is in an opposing direction; a second spring to engage the second receiver when the rotational force is in the first direction and also when the rotational force is in the opposing direction; and a spacer formed of a material softer and more compressible than the hub and spindle inserted between the spindle and hub configured to retain a positive engagement between the spindle and hub.

The door handle adapter according to claim 1, wherein the hub is formed of one of zinc, brass, steel, and aluminum, and the spacer is a polymer.

The door handle adapter according to claim 1, further comprising a liner providing a backstop for the first and second spring, wherein the first and second receiver provide opposing backstops for the respective first and second springs, thereby sandwiching at least a portion of each spring in-between, respectively.

The door handle adapter according to claim 3, wherein the first and second receivers are inserted in-between a plurality of coils of the respective first and second springs, thereby engaging the springs when the slider is linearly displaced by the axial rotation of the spindle and hub.

The door handle adapter according to claim 1, wherein the slider is linearly displaced in the same direction when the hub is axially rotated the first direction as when the hub is axially rotated the opposing direction.

The door handle adapter according to claim 1, wherein the first and second springs maintain a torsional resistance against the input rotational force at all times.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
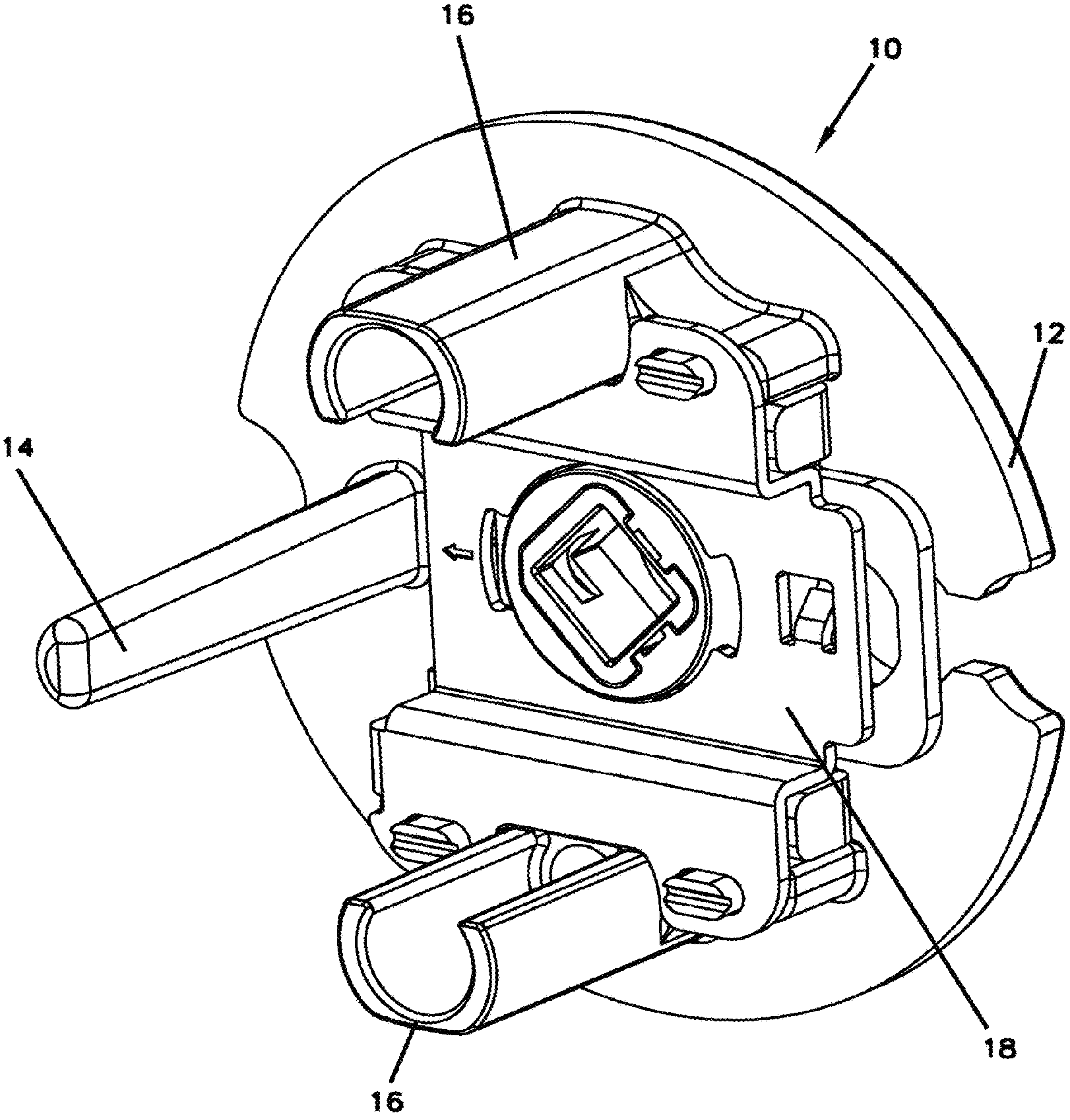
FIG. 1 shows a perspective view of an adapter according to an embodiment of the invention.
Figure 2:
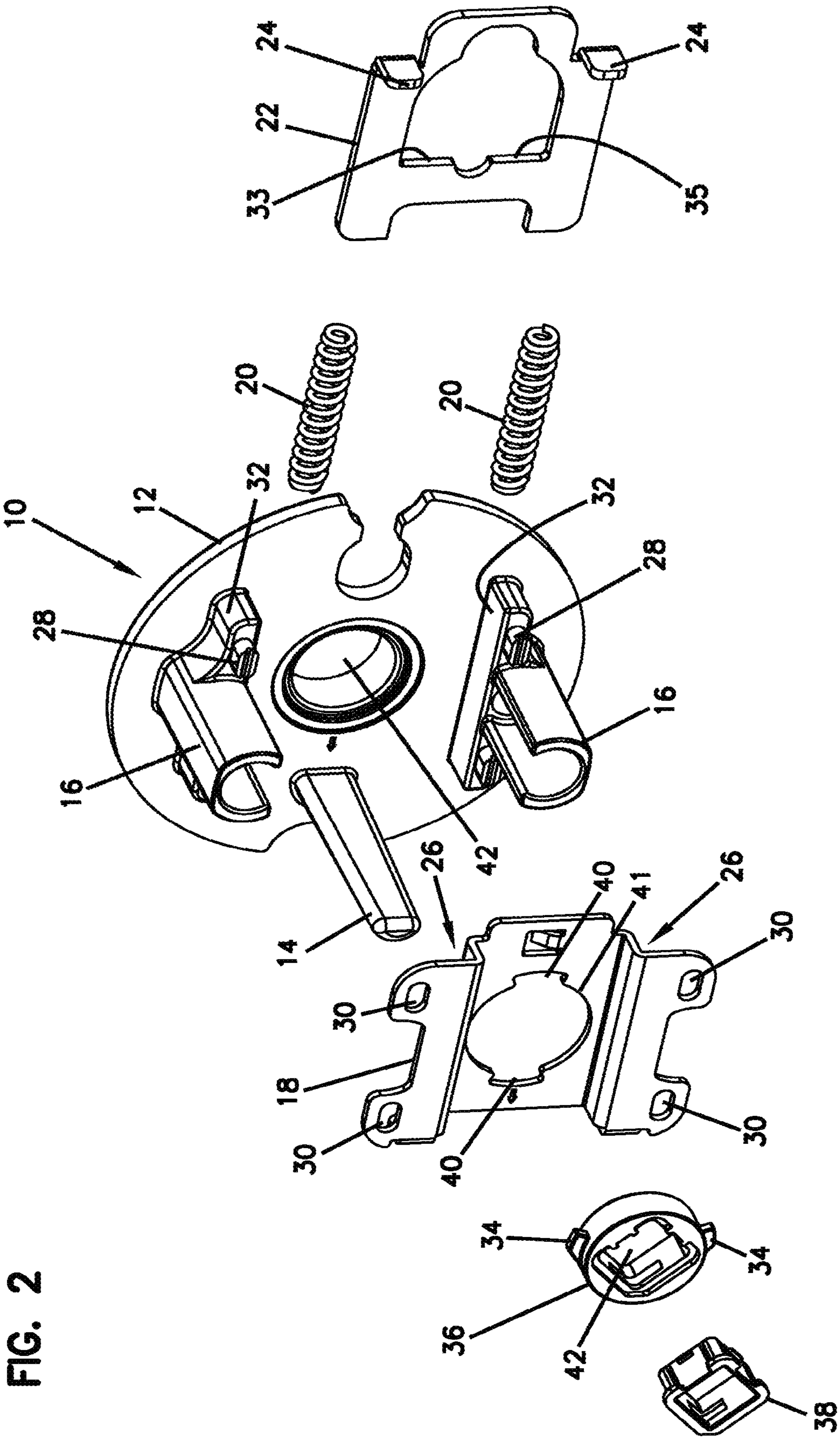
FIG. 2 shows an exploded perspective view of the adapter of FIG. 1.

Beginning with FIG. 1, an adapter 10 is shown. The adapter 10 is configured for installation on an interior side of an entry door. The adapter 10 is preferably formed of a single-piece with an arm 14 and pair of receivers 16 extending from a flange 12. The flange 12 is intended to rest on the interior surface of a door while the receivers 16 and arm 14 protrude into the hole formed into the door for the door handle (not pictured). The adapter 10 is also shown in FIG. 2 in exploded form with the spring plate 18 components separated for view.

A slide 22 includes spring stops 24 that extend from the slide 22. The spring stops 24 contain a spring 20 on each side of hole 42 formed in the adapter 10. The spring plate 18 contains the springs within spring chambers 26 thereby allowing the slide 22 to slide and compress springs 20 in the spring chambers 26 and rebound due to the spring force.

The adapter 10 includes a plurality of studs 28 extending from the flange 12. The studs 28 in particular extend from a base 32 that in turn extends from the flange 12, and act as mounting bosses to locate and retain the spring plate 18 in place. Each stud 28 is inserted into an aperture 30 on the spring plate 18 thereby preventing movement of the spring plate 18. The hole 42 formed in the center of the adapter 10 is lined up with the opening 41 in the spring plate 18. The opening 41 in the spring plate 18 includes slots 40 that receive engagers 34 on the outer diameter of a hub 36.

The hub 36 is configured to rotate within the hole 42 of the adapter and opening 41 of the spring plate 18. As the hub 36 rotates, the engagers 34 contact one of a first contact 33 and a second contact 35 on the slide 22. The engagers 34 interact with the first contact 33 or second contact 35 thereby causing the slide 22 to compress the springs 20 within the spring chamber 26. As a result, the hub 36 is compelled to rotate back to a "home" position by the stored energy in the springs 20, urging the inside lever 52 (see FIG. 3) in a horizontal position, whenever the hub 36 is rotated. A sleeve 38 may also be inserted into the central aperture 42 of the hub 36. Preferably, the sleeve 38 is made out of a compressible material such as plastic.

The sleeve 38 acts as a buffer to take up any play that a spindle 48 (shown in FIG. 3) may have with the central aperture 42 in the hub 36. The spindle 48 is therefore preferable pressed into the sleeve 38 such that a press-fit is required. Due to the nature of manufacturing processes used to form the spindle 48 and hub 36, it is very difficult to eliminate any play between the two components. Incorporating a sleeve 38 with a press-fit ensures a consistent, secure mating between the parts without any slop or play.

Figure 3:
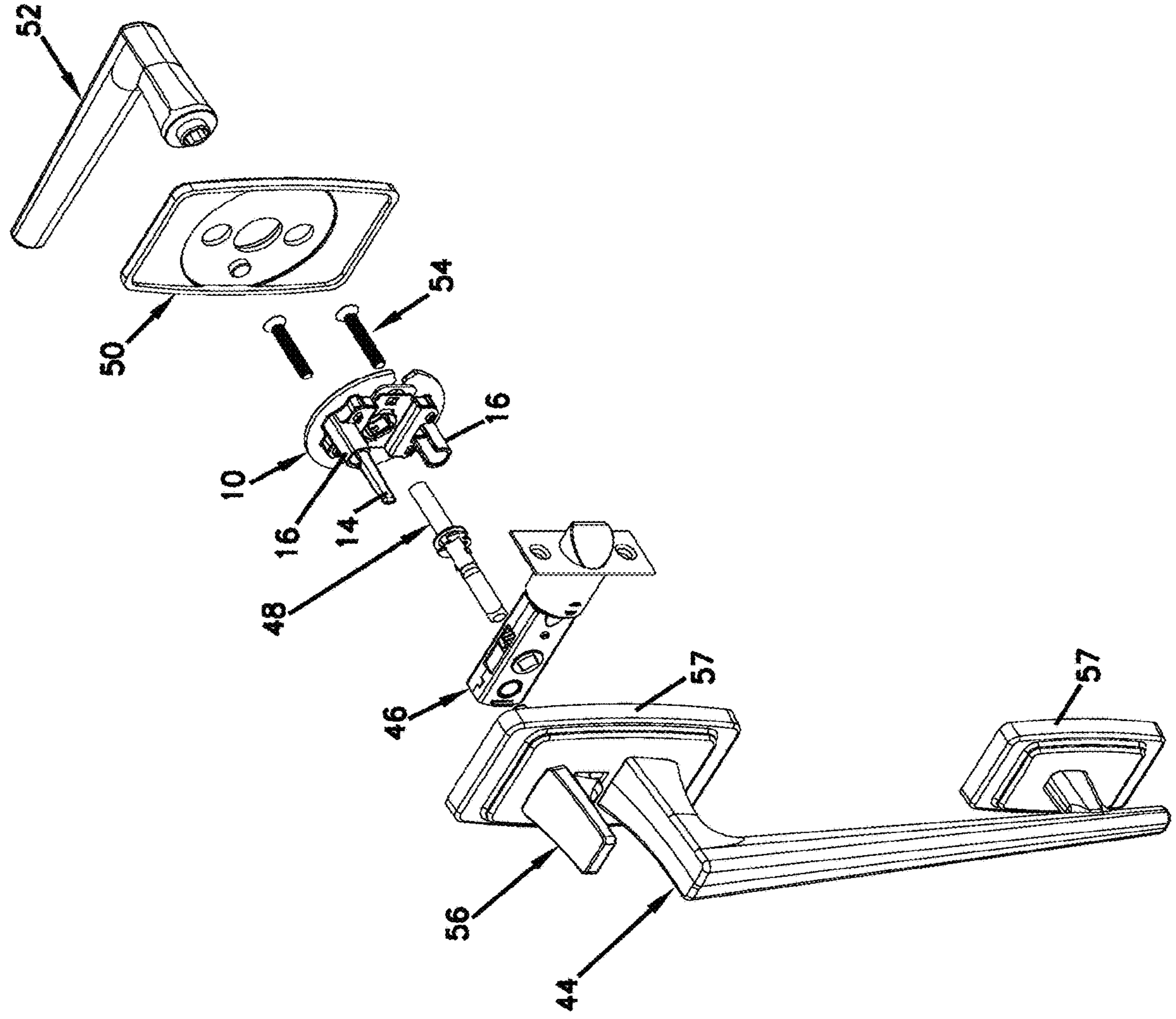
FIG. 3 shows a partially exploded perspective view of a handle set installation using the adapter of FIG. 1.
Figure 4:
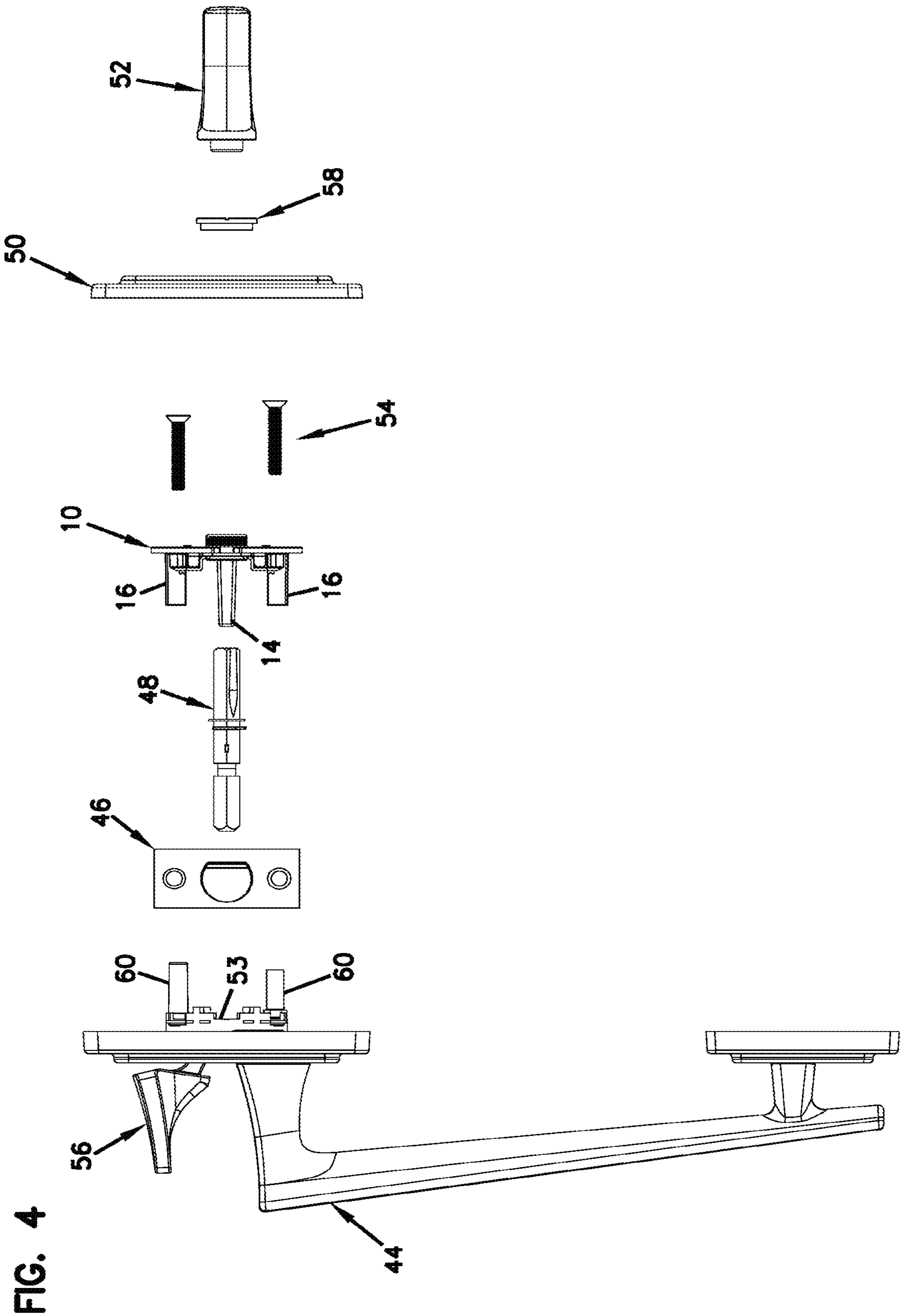
FIG. 4 shows a side view of the handle set installation of FIG. 3.

Referring to FIGS. 3 and 4, the adapter 10 described in FIGS. 1 and 2 is shown in an exploded installation of a handle set for an entry door application. The outside handle 44 is configured for mounting on an exterior side of an entry door (not pictured). A rose 57 conceals the mounting points of the outside handle 44 to the door. A switch 56 may be depressed in order to rotate the spindle 48. The switch 56 is connected to a mechanical device 53 concealed by the rose 57 in FIG. 3, but viewable in FIG. 4, that converts the linear motion generated when the switch 56 is depressed into a rotary motion. This rotary motion is transferred to the latch 46, adapter 19, and inside lever 52 by the spindle 48. The spindle 48 also mechanically links the inside lever 52 to the adapter 10, latch 46, and switch 56. Preferably, a multi-piece spindle 48 is used and the portion of the spindle 48 in contact with the switch operates just the latch 46 to avoid movement of the switch 56 from rotating the inside lever 52, and vice versa.

A rose 50 conceals the adapter 10 and fasteners 54 that are used to secure the adapter to the interior side of the door. The fasteners 53 pass through the receivers 16 in the adapter 10 and into the posts 60 of the outside handle 44. As the fasteners 54 are tightened, the adapter 10 and outside handle 44 are drawn together thereby squeezing the door in between and securing them to the door. The latch 46 is held in place by both the spindle 48 passing through the latch 46 and the arm 14 passing through the latch 46. The spindle 48 rotates to retract the latch 46 while the arm 14 prevents the latch 46 from rotating. A rose trim screw 58 fastens to the adapter 10 and maintains the rose 50 secured to the adapter 10.

As previously discussed, the springs 20 and sleeve 38 maintain the inside lever 52 at a home position, as depicted in FIG. 4. The sleeve 38 also prevents any rotational slop in the movement of the inside lever 52. The result is that a more-positive and secure connection of the inside lever 52 to the spindle 48 and adapter 10.

Figure 5:
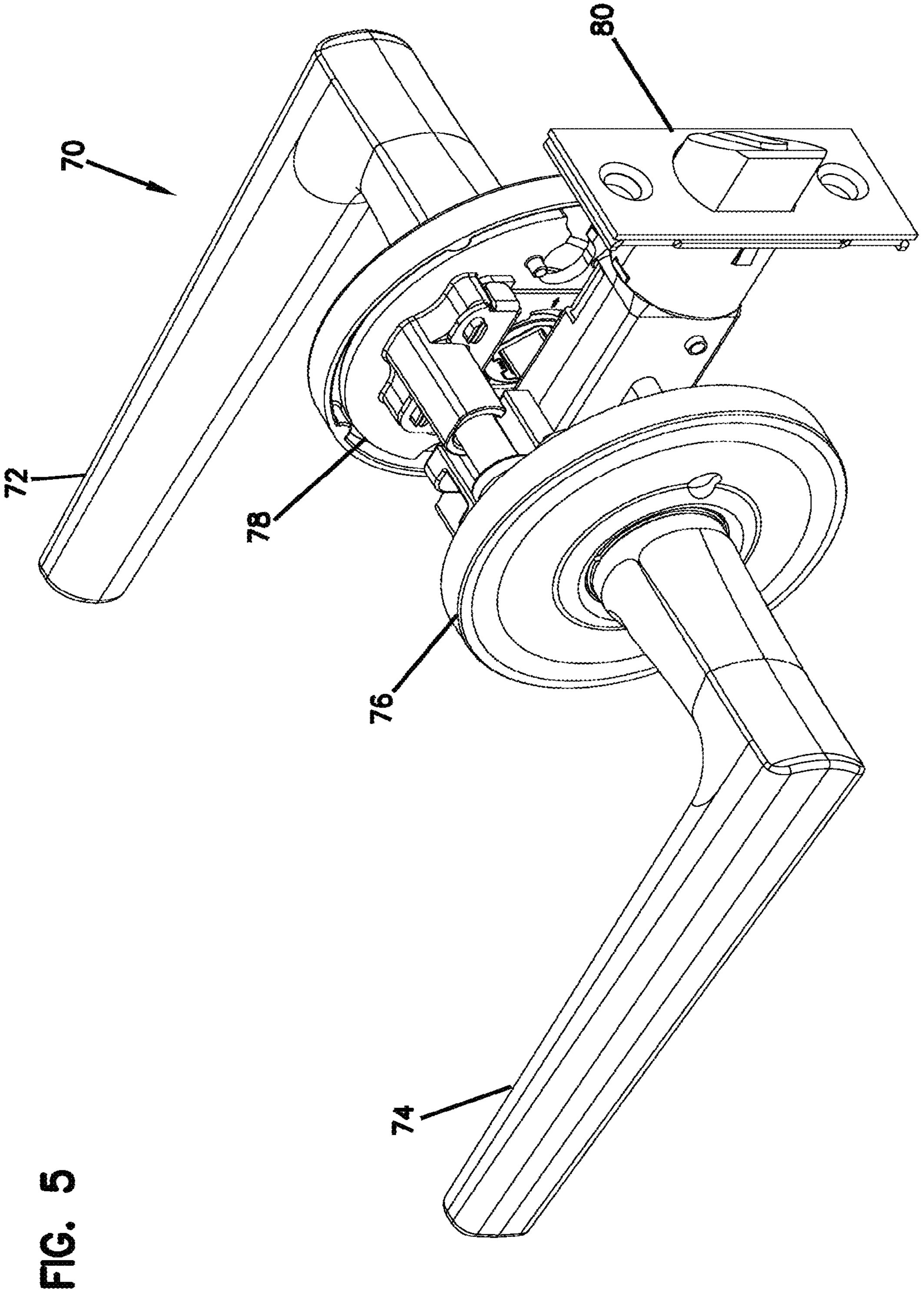
FIG. 5 shows a perspective view of a lever set installation using an adapter according to an alternative embodiment of the invention.

Another embodiment of the invention is shown in FIG. 5 as a lever set 70 incorporating the spring plate 18, slide 22, springs 20, and sleeve 38 as shown in FIG. 2. In this embodiment, an exterior lever 74 and exterior rose 76 are mounted to the exterior side of a door (not pictured). An interior lever 72 and interior rose 78 are mounted to an interior side of the door. The interior lever 72 and the exterior lever 74 may be rotated to retract latch 80 thereby allowing the door to open. As there are two levers used in this embodiment as opposed to a single lever and a handle, there are slight differences from the previously-mentioned embodiment. These differences do not affect the function of the springs 20, slide 22, spring plate 18, hub 36, and sleeve 38 as described with respect to FIGS. 1 and 2.

Figure 6:
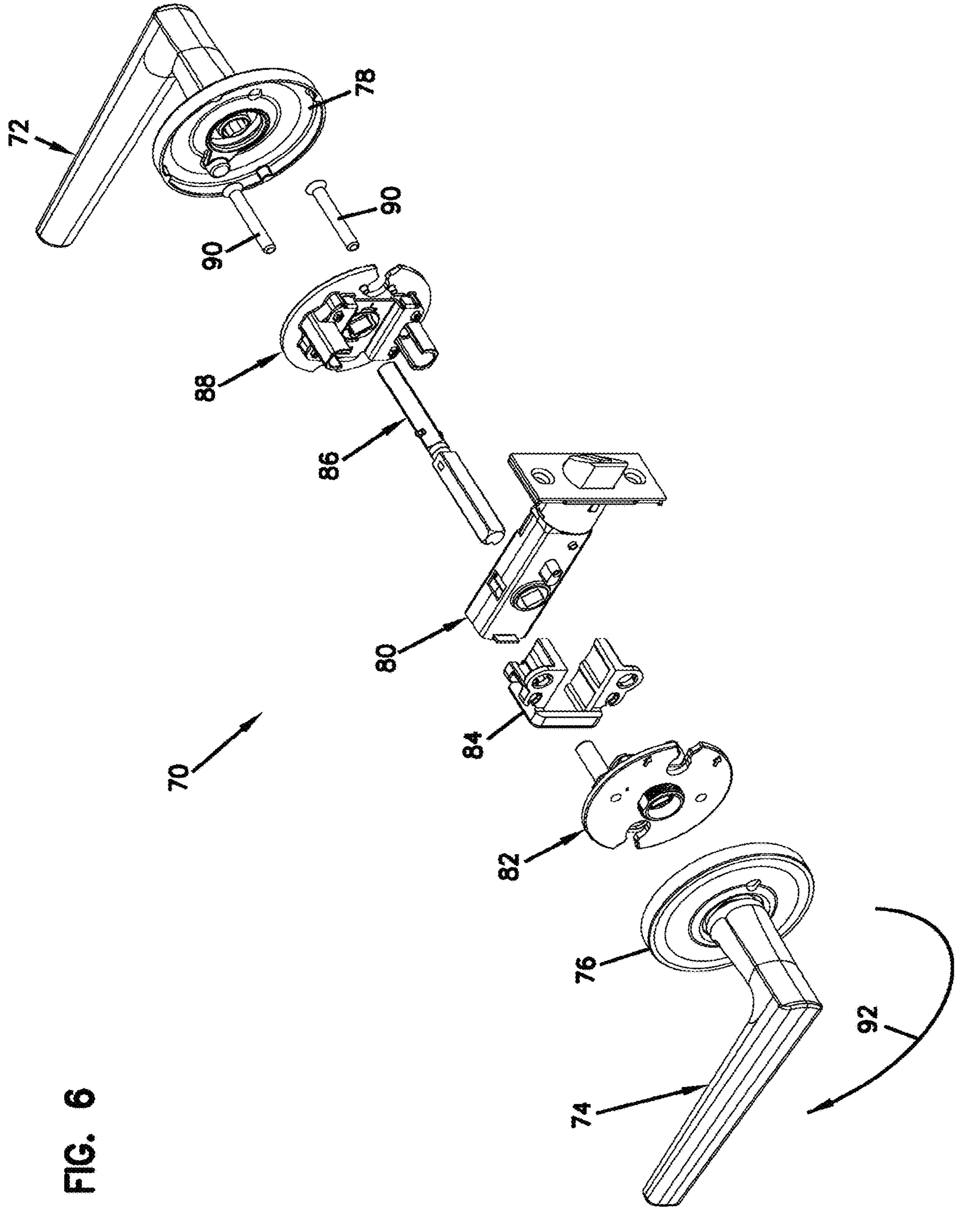
FIG. 6 shows a partially exploded perspective view of the lever set installation according to FIG. 5.

FIG. 6 shows an exploded view of the lever set 70. A second adapter 82 is shown, one on the interior side and one on the exterior side. Each adapter 88, 82 includes the same parts and functions similarly. One of the adapters is configured to receive fasteners (female fitting) while the opposing adapter has through holes (male fitting). The exterior lever 74 is joined to the spindle 86 thereby allowing rotational force 92 to transfer to the second adapter 82, latch 80, adapter 88 and interior lever 72. As the rotational force 92 is applied to the exterior lever 74 the adapter 82 adds opposing tension to resist the rotational force 92. This opposing tension assists in maintaining the exterior lever 74 in a home, horizontal position. An exterior rose 76 may also be used to conceal the adapter 82 which is secured to the surface of the door. As the adapter 88 used in a lever set 70 application does not have an arm 14 as shown in FIGS. 1 and 2, an adapter bracket 84 is used to secure the latch 80 in place and prevent rotation as the spindle 86 is rotated by either the exterior lever 74 or the interior lever 72. Fasteners 90 pass through the adapter 88, through the adapter bracket 84 and into the adapter 82. The fasteners 90 sandwich the door between the adapter 82 and the adapter 88 while the latch 80 and adapter bracket 84 remain within a bore in the door. An interior rose 78 conceals the adapter 88 and the exterior rose 76 conceals the adapter 82.

Figure 7:
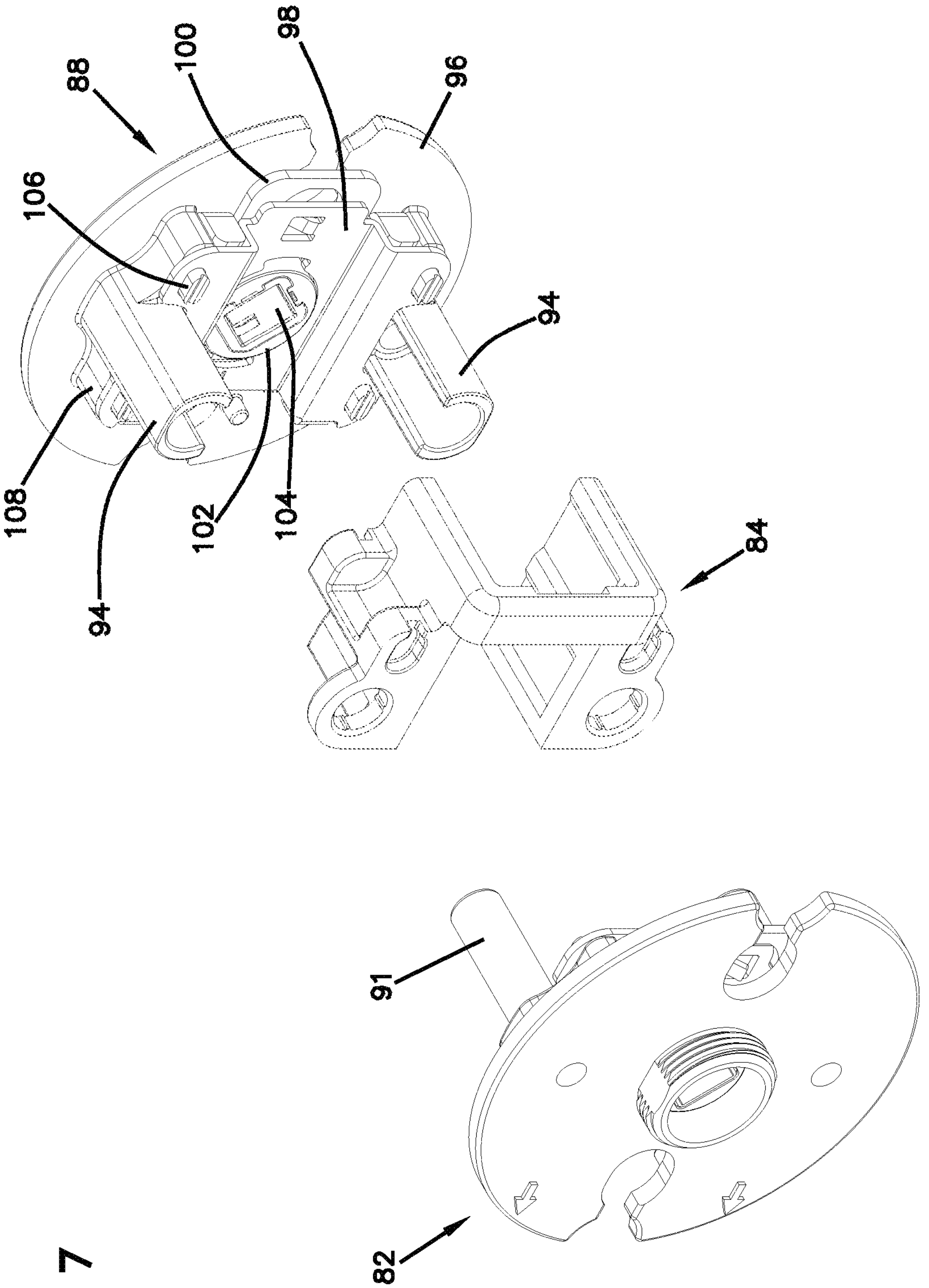
FIG. 7 shows a partially exploded perspective view of the adapter of FIG. 5.

Referring to FIG. 7, a partially exploded view of the adapter 88, adapter 82, and bracket 84 is shown. The adapter 88 shown in FIGS. 6 and 7 is the same as the adapter 10 shown in FIGS. 1 and 2, except that the adapter 88 does not include an arm 14. This is due to the difference in application of using a handle set shown in FIG. 3 as opposed to a lever set shown in FIG. 5. The mechanical workings of the adapter 88 do not differ from the previously discussed mechanicals of adapter 10 shown and described with respect to FIG. 2.

The adapter 88 shown in FIG. 7 includes a bracket 84 that holds the latch 80 in position as a rotational force 92 is applied to either lever (see FIG. 6). As previously described, the adapter 88 includes a pair of receivers 94 that accept posts 90 from the adapter 82. Studs 106 maintain the spring plate 98 and slide 100 in place and secured to the base 108 of the flange 96. As rotational force 92 is applied (as shown in FIG. 6), the sleeve 104 and hub 102 rotate thereby compressing the springs within the spring chambers of the spring plate 98 as previously described with respect to FIG. 2.

With both embodiments of the invention as described with respect to FIGS. 2 and 7, both adapters 10, 88 perform the same functions with the same components. The only difference is a lack of an arm 14 with the embodiment shown in FIG. 7. As a result, the adapters 10, 88 minimize any play in the lever through the use of a sleeve 38 shown in FIG. 2 or sleeve 104 shown in FIG. 7. The sleeve is preferably formed out of a compressible material such as plastic allowing for a greater range of manufacturing tolerances when constructing the associated spindle. The overall goal is to provide a tight, press-fit between the spindle and the sleeve. The use of springs 20, shown in FIG. 2, also minimizes any unintended sagging of the lever due to the weight of the lever itself. The springs 20 can therefore be pre-loaded to maintain the levers at the predetermined home position of horizontal when not in use, despite having a great mass due to solid forging manufacturing techniques. In accordance with the preceding disclosure various aspects of a door handle adapter are disclosed, In one aspect, the door handle adapter includes a spindle configured to engage the door handle and transfer an input rotational force from the door handle, as well as a hub with a central aperture configured to receive the spindle and further transfer the rotational force from the spindle. The door handle adapter includes a first engager extending from an outer circumference of the hub, and a second engager opposite the first engager extending from the outer circumference of the hub. The adapter includes a slider with a first receiver configured to engage the first engager and a second receiver configured to engage the second engager such that as the rotational force is transmitted to the hub, thereby axially rotating the hub, at least one of the first and second engager linearly displace the slider. The adapter further includes a first spring configured to engage the first receiver when the rotational force is in a first direction and also when the rotational force is in an opposing direction, as well as a second spring to engage the second receiver when the rotational force is in the first direction and also when the rotational force is in the opposing direction. The adapter includes a spacer formed of a material softer and more compressible than the hub and spindle inserted between the spindle and hub configured to retain a positive engagement between the spindle and hub.

In further examples, the adapter described above may be modified by the hub being formed of one of zinc, brass, steel, and aluminum, and the spacer is a polymer. Stull further, such an adapter can include a liner providing a backstop for the first and second spring, wherein the first and second receiver provide opposing backstops for the respective first and second springs, thereby sandwiching at least a portion of each spring in-between, respectively. The first and second receivers can be inserted in-between a plurality of coils of the respective first and second springs, thereby engaging the springs when the slider is linearly displaced by the axial rotation of the spindle and hub.

Still further, in some example aspects, the slider of any of the above examples is linearly displaced in the same direction when the hub is axially rotated the first direction as when the hub is axially rotated the opposing direction. Further the first and second springs maintain a torsional resistance against the input rotational force at all times.

In a further example, a door handle adapter includes a hub with an open inner circumference configured to receive a spindle and transfer a rotational force input into the spindle, as well as a first engager extending from an outer circumference of the hub. The door handle adapter further includes a second engager extending from the outer circumference of the hub, as well as a slider with a first receiver configured to engage the first engager and a second receiver configured to engage the second engager such that, as the rotational force is transferred to the hub, the hub axially rotates, thereby urging a linear displacement of the slider through contact between one of the first engager with the first receiver and the second engager with the second receiver. The door handle adapter includes a first spring configured to engage the first receiver when the rotational force is in a first direction, and a second spring configured to engage the second receiver when the rotational force is in a second direction opposing the first direction. The door handle adapter includes a spacer, formed of a material softer and more compressible than the hub and the spindle, press-fitted between the spindle and hub configured to retain a positive engagement between the spindle and hub.

In further aspects, the hub of the above door handle adapter is formed of one of zinc, brass, steel, and aluminum, and the spacer is a polymer. The door handle adapter above can further include a liner providing a backstop for the first and second spring, wherein the first and second receiver provide opposing backstops for the respective first and second springs, thereby sandwiching at least a portion of each spring in-between the respective backstop and receiver. In some aspects, the first and second receivers are inserted in-between a plurality of coils of the respective first and second springs, thereby engaging the springs when the slider is moved. In further aspects, the slider is linearly displaced in the same direction irrespective of a direction of the rotational force of the hub. In some aspects, the first and second springs maintain a torsional resistance against the input rotational force at all times.

In a still further example, a door handle adapter includes a hub with an open inner circumference configured to receive a spindle and transfer a rotational force input into the spindle, as well as a first engager extending from an outer circumference of the hub. The door handle adapter further includes a slider with a first receiver configured to engage the first engager such that as the rotational force is transferred to the hub, the hub axially rotates thereby urging a linear displacement of the slider through contact between the first engager with the first receiver. The door handle adapter further includes a first spring configured to engage the first receiver when the rotational force is in a first direction. The door handle adapter also includes a spacer, formed of a material softer and more compressible than the hub and the spindle, press-fitted between the spindle and hub configured to retain a positive engagement between the spindle and hub.

In further examples, the hub is formed of one of zinc, brass, steel, and aluminum, and the spacer is a polymer. The door handle adapter can also include a liner providing a backstop for the first spring, as well as a backstop for the first spring formed from a portion of the liner, thereby sandwiching at a portion of the first spring in-between the backstop and receiver. In such examples, the first receiver is inserted in-between a plurality of coils of the first spring, thereby engaging the spring when the slider is moved.

In further example aspects, the slider is linearly displaced in the same direction irrespective of a direction of the rotational force of the hub. Additionally, the first spring maintains a torsional resistance against the input rotational force at all times. The door handle adapter can further include a second engager extending from the outer circumference of the hub, a second receiver connected to the first receiver configured to engage the second engager, and a second spring configured to engage the second receiver when the rotational force is in the first direction and also when the rotational force is in a second direction opposing the first direction. In such examples, the first receiver and second receiver are joined together proximate the hub.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A door handle adapter assembly comprising:

a spindle configured to engage a door handle and transfer an input rotational force from the door handle to a latch;

a door handle adapter comprising:

a flange including a flange aperture;

a hub including a hub aperture, the hub aperture aligning with the flange aperture along a spindle axis, the spindle extending through the hub aperture and flange aperture, the hub also including an outer surface positioned at least partially within the flange aperture, the hub also including first and second engagers extending outwardly from the outer surface;

a plate having a plate aperture aligning with the spindle axis and extending around the hub;

a slider positioned between the flange and the plate, the slider including a slider aperture and defining a first receiver and a second receiver positioned about the slider aperture, the first receiver configured to contact the first engager and the second receiver configured to contact the second engager such that the input rotational force rotates the hub about the spindle axis and thereby rotates the first and the second engagers to displace the slider in a direction transverse to the spindle axis, the slider also including first and second spring stops;

first and second springs positioned within first and second spring chambers, the first spring chamber including a first end defined by the plate and a second end defined by the first spring stop, the second spring chamber including a first end defined by the plate and a second end defined by the second spring stop, wherein the input rotational force causes engagement of a receiver of the first receiver and the second receiver by an engager of the first engager and the second engager to move the slider along a direction transverse to the spindle axis and compress the first and second springs when the input rotational force is in a first rotational direction and also when the input rotational force is in an opposing rotational direction;

wherein when the first spring is in an extended position, first and second ends of the first spring are on opposite sides of the plate aperture about the spindle axis.

2. The door handle adapter assembly of claim 1, wherein the door handle adapter further includes a spacer inserted between the spindle and the hub configured to retain a positive engagement between the spindle and the hub.

3. The door handle adapter assembly of claim 2, wherein the spacer is formed of a material softer and more compressible than the hub and the spindle.

4. The door handle adapter assembly of claim 1, wherein the hub is formed of one of zinc, brass, steel, and aluminum, and the spacer is a polymer.

5. The door handle adapter assembly of claim 1, wherein the first and second springs extend parallel to each other and on opposite sides of the plate aperture about the spindle axis.

6. The door handle adapter assembly of claim 1, wherein the slider is linearly displaced in the same direction when the hub is axially rotated the first direction as when the hub is axially rotated the opposing direction.

7. The door handle adapter assembly of claim 1, wherein the first spring and the second spring maintain a torsional resistance against the input rotational force.

8. The door handle adapter assembly of claim 1, wherein the plate includes a first tab defining the first end of the first spring chamber and a second tab defining the first end of the second spring chamber.

9. The door handle adapter assembly of claim 1, wherein the spindle extends through the slider aperture.

10. The door handle adapter assembly of claim 1, wherein the spindle extends through each of the flange aperture, the hub aperture, the plate aperture, and the slider aperture.

11. The door handle adapter assembly of claim 1, wherein the flange further includes a base having a plurality of studs, the plurality of studs providing mounting locations to retain the plate relative to the flange.

12. A door handle adapter assembly comprising:

a spindle;

a door handle adapter comprising:

a flange including a flange aperture;

a hub including a hub aperture, the hub aperture aligning with the flange aperture along a spindle axis, the spindle extending through the hub aperture and flange aperture, the hub also having an outer circumference positioned at least partially within the flange aperture, the hub including first and second engagers extending outwardly from the outer circumference;

a plate having a plate aperture aligning with the spindle axis and extending around the hub;

a slider positioned between the flange and the plate, the slider including a slider aperture and defining a first receiver and a second receiver positioned about the slider aperture, the first receiver configured to contact the first engager and the second receiver configured to contact the second engager such that the input rotational force rotates the hub about the spindle axis and thereby rotates the first and the second engagers to displace the slider in a direction transverse to the spindle axis, the slider also including first and second spring stops;

first and second springs positioned within first and second spring chambers, the first spring chamber including a first end defined by the plate and a second end defined by the first spring stop, the second spring chamber including a first end defined by the plate and a second end defined by the second spring stop, wherein the input rotational force causes engagement of a receiver of the first receiver and the second receiver by an engager of the first engager and the second engager to move the slider along the direction transverse to the spindle axis and compress the first and second springs;

wherein the spindle extends through the slider aperture;

wherein the first and second springs extend parallel to each other and on opposite sides of the plate aperture about the spindle axis.

13. The door handle adapter assembly of claim 12:

wherein the input rotational force causes engagement of the first receiver by the first engager to move the slider along the direction transverse to the spindle axis and compresses the first and second springs when the input rotational force is in a first rotational direction, and wherein the input rotational force causes engagement of the second receiver by the second engager to move the slider along the direction transverse to the spindle axis and compresses the first and second springs when the input rotational force is in a second rotational direction opposite the first rotational direction.

14. The door handle adapter assembly of claim 12, wherein the door handle adapter further includes a spacer positioned within the hub aperture and configured to retain a positive engagement between the spindle and the hub.

15. A door handle adapter assembly comprising:

a spindle configured to engage a door handle and transfer an input rotational force from the door handle to a latch;

a door handle adapter comprising:

a flange including a flange aperture;

a hub including a hub aperture, the hub aperture aligning with the flange aperture along a spindle axis, the spindle extending through the hub aperture and flange aperture, the hub also including an outer surface positioned at least partially within the flange aperture, the hub also including first and second engagers extending outwardly from the outer surface;

a plate having a plate aperture aligning with the spindle axis and extending around the hub;

a slider positioned between the flange and the plate, the slider including a slider aperture and defining a first receiver and a second receiver positioned about the slider aperture, the first receiver configured to contact the first engager and the second receiver configured to contact the second engager such that the input rotational force rotates the hub about the spindle axis and thereby rotates the first and the second engagers to displace the slider in a direction transverse to the spindle axis, the slider also including first and second spring stops;

first and second springs positioned within first and second spring chambers, the first spring chamber including a first end defined by the plate and a second end defined by the first spring stop, the second spring chamber including a first end defined by the plate and a second end defined by the second spring stop, wherein the input rotational force causes engagement of a receiver of the first receiver and the second receiver by an engager of the first engager and the second engager to move the slider along a direction transverse to the spindle axis and compress the first and second springs when the input rotational force is in a first rotational direction and also when the input rotational force is in an opposing rotational direction;

wherein the first and second springs extend parallel to each other and on opposite sides of the plate aperture about the spindle axis.

16. The door handle adapter assembly of claim 15, wherein the door handle adapter further includes a spacer inserted between the spindle and the hub configured to retain a positive engagement between the spindle and the hub.

17. The door handle adapter assembly of claim 15, wherein the slider is linearly displaced in the same direction when the hub is axially rotated the first direction as when the hub is axially rotated the opposing direction.

18. The door handle adapter assembly of claim 15, wherein the first spring and the second spring maintain a torsional resistance against the input rotational force.

19. The door handle adapter assembly of claim 15, wherein the plate includes a first tab defining the first end of the first spring chamber and a second tab defining the first end of the second spring chamber.

20. The door handle adapter assembly of claim 15, wherein the flange further includes a base having a plurality of studs, the plurality of studs providing mounting locations to retain the plate relative to the flange.

* * * * *